United States Patent [19]

Oyaizu

[11] Patent Number: 5,039,775

[45] Date of Patent: Aug. 13, 1991

[54] PROCESS FOR PRODUCING POLYUREA RESIN

[75] Inventor: Yoshijiro Oyaizu, Shizuoka, Japan

[73] Assignee: Ihara Chemical Industry Co., Ltd., Tokyo, Japan

[21] Appl. No.: 465,601

[22] Filed: Jan. 18, 1990

Related U.S. Application Data

[63] Continuation of Ser. No. 155,293, Feb. 12, 1988, abandoned.

[30] Foreign Application Priority Data

Feb. 18, 1987 [JP] Japan ................................. 62-34848

[51] Int. Cl.$^5$ .............................................. C08G 18/32
[52] U.S. Cl. ........................................ 528/68; 528/60; 528/64
[58] Field of Search ............................. 528/60, 64, 68

[56] References Cited

U.S. PATENT DOCUMENTS

| | | | |
|---|---|---|---|
| 3,256,213 | 6/1966 | Gmitter et al. | 521/112 |
| 3,808,250 | 4/1974 | Blahat et al. | 260/455 R |
| 4,328,322 | 5/1982 | Baron | 521/163 |
| 4,328,959 | 3/1988 | Otani et al. | 528/68 |
| 4,504,648 | 3/1985 | Otani et al. | 528/76 |

FOREIGN PATENT DOCUMENTS 2009764 of 0000 United Kingdom .

Primary Examiner—John Kight, III
Assistant Examiner—Dennis R. Daley
Attorney, Agent, or Firm—Oblon, Spivak, McClelland, Maier & Neustadt

[57] ABSTRACT

A process for producing polyurea resin in which an amine compound containing aromatic polyamine and specific aminobenzoate derivative and polyisocyanate are reacted. The polyurea resin is decreased in temperature dependence and improved in hardness, strength, toughness, and heat resistance.

12 Claims, No Drawings

PROCESS FOR PRODUCING POLYUREA RESIN

This application is a continuation of U.S. application Ser. No. 155,293, filed on Feb. 12, 1988, now abandoned.

BACKGROUND OF THE INVENTION (1) Field of the Invention

This invention relates to a process for producing polyurea resin, and more particularly to a process for producing polyurea resin high in hardness, and strength, and excellent in heat resistance so as to be useful for a roller for making paper, steel, business machines, and the like.

(2) Description of the Prior Art

For the production of polyurea resin has been conventionally known a process for producing a polyurea elastomer which is adapted to react a specific oligomer amino benzoate compound obtained by reacting aminobenzoate with polyol, acting as a curing agent, with polyisocyanate, as disclosed in Japanese Patent Publication No. 32641/1985, Japanese Patent Application Laid-Open No. 135514/1981, and U.S. Pat. No. 4,328,322. Also, a process for producing a polyurethane urea polymer is proposed which is adapted to subject a compound obtained by adding a hydroxyl group to amino benzoate at a predetermined ratio, which serves as a curing agent, and polyisocyanate to a polyaddition reaction, as disclosed in Japanese Patent Application Laid-Open No. 89322/1984.

The former process for producing a polyurea elastomer using an oligomer amino benzoate compound is disadvantageous in that the so-obtained elastomer has a maximum Shore hardness as low as 45. When the molecular weight of a polyol moiety in the oligomer amino benzoate compound is decreased to avoid this problem, the viscosity of the mixture of the elastomer components increases to a degree sufficient to deteriorate the workability of the mixture, and the temperature dependence of the elastomer increases as well. Thus, the process failed to produce a polyurea elastomer of sufficient hardness and heat resistance.

A polyurethane urea polymer obtained according to the above-described latter process which uses an amino benzoate compound containing a hydroxyl group is clearly different in structure from a polyurea polymer. Unfortunately it had the disadvantage of decreased heat resistance due to its hydroxyl group of 10% or more at its terminal. The polymer also failed to exhibit a hardness of 70-80 in Hs(D) sufficient for use for a roll for making paper or steel. Its maximum hardness, in fact, was as low as 50 in Hs(D).

BRIEF SUMMARY OF THE INVENTION

Accordingly, it is an object of the present invention to provide a novel process for producing polyurea resin that is decreased in temperature dependence and highly increased in hardness, strength, toughness, and heat resistance.

It is another object of the present invention to provide a process for producing polyurea resin exhibiting excellent physical properties and heat resistance.

It is another object of the present invention to provide a process for producing polyurea resin, in which good workability is attained without the use of solvent.

It is a further object of the present invention to provide a polyurea resin of high hardness, and strength and excellent heat resistance so as to be useful for a roller for making paper, steel, business machines, and the like.

Other and further objects, features, and advantages of the invention will be detailed more fully in the following description.

DETAILED DESCRIPTION OF THE INVENTION

It has found that the above-noted objects of the present invention are accomplished by reacting an amine compound represented by a formula (I), described below, together with an aromatic polyamine with polyisocyanate.

The present invention provides a process for producing polyurea resin in which an amino compound represented by the formula (I) and aromatic polyamine and polyisocyanate are reacted together

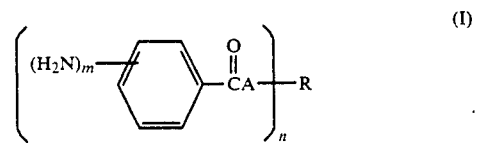

wherein, R represents n-valent polyalkylene, polyalkylene ether, or polyalkylene polyester group with an average molecular weight of 200 or more, preferably 200 to 5000, in which the group may contain unsaturated bond, A represents an oxygen atom or an imino group, m is an integer of 1 to 3, and n is an integer of 2 to 4. The residues that bond to R may be same or different to each other.

The amine compound used in the present invention and represented by the formula (I) described above may be synthesized according to a process disclosed in Japanese Patent Publication No. 32641/1985 and Japanese Patent Application Laid-Open No. 135514/1981. More particularly, it is prepared by (a) a method in which a nitro compound which is obtained by reacting a polyol compound or a polyol containing a terminal amino group represented by the following formula (II)

(wherein R, A and n as described above) with o-, m- or p-nitrobenzoyl chloride, dinitrobenzoyl chloride, or trinitrobenzoyl chloride in an amount of n equivalents in the presence of a dehydrochlorination agent, is subjected to reduction according to a conventional procedure, or by (b) a method in which the polyol or the polyol containing a terminal amino group represented by the formula (II) is reacted with isatoic acid anhydride in an amount of n equivalents.

The polyol compounds and the polyol containing a terminal amino group of formula (II) which are used for synthesizing the amine compound of formula (I) include, for example, aliphatic polyester glycols such as polyethylene adipate, polybutylene adipate, and polypropylene adipate and the like, which are obtained by condensating aliphatic glycol with dicarboxylic acid to extend its chain length; polyalkylene ether glycols such as polypropylene ether glycol and tetramethylene ether glycol and the like, which are obtained by ring opening polymerization of ethylene oxide, propylene oxide, and tetrahydrofuran and the like; polyester glycols obtained by ring-opening polymerization of ε-caprolactone; compounds obtained by hydroxylation of a terminal group of polybutadiene; compounds obtained by copolymerization of at least two kinds of alkylene oxides; compounds obtained by copolymerization of at least two kinds of glycols with dicarboxylic acid; polyester polyols obtained by copolycondensation of long chain diols such as a mixture of aromatic glycols and the like; polyol such as glycerine or trimethylol propane, aliphatic glycol, and dicarboxylic acid; polyether polyols obtained by ring-opening polymerization of ethylene oxide, propylene oxide, and tetrahydrofuran or the like using polyol such as glycerine, trimethylol propane or the like as an initiator, and polyols containing a terminal amino group obtained by substitutionally changing a terminal hydroxyl group thereof into an amino group according to a known amination treatment; and the like.

It has been found that in the present invention the use of polyether polyol as a polyol component produces an elastomer which has satisfactory physical properties, as in a conventional prepolymer process for preparing polyurethane elastomer.

Amine compounds represented by the above-described formula (I) which are suitable for in the present invention include the following:

Polyethylene glycol bis(4-aminobenzoate)

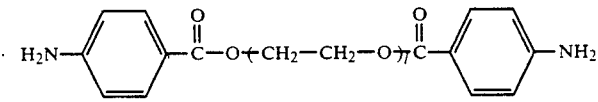

Polyethylene glycol bis(2-aminobenzoate)

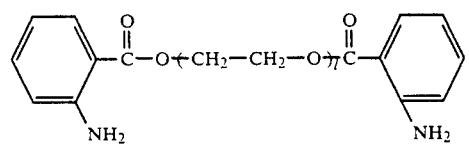

Polyethylene glycol bis(3-aminobenzoate)

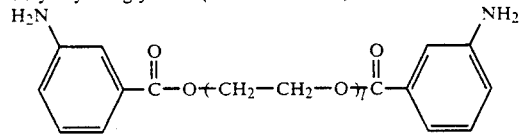

Polytetramethylene glycol bis(4-aminobenzoate)

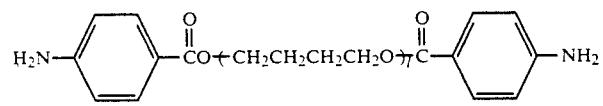

Polytetramethylene glycol bis(2-aminobenzoate)

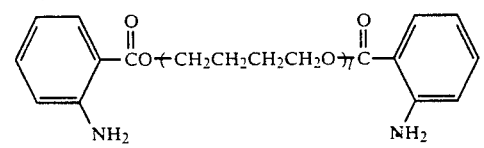

Polypropylene glycol bis(4-aminobenzoate)

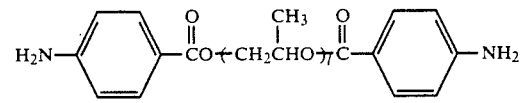

Polypropylene glycol bis(2-aminobenzoate)

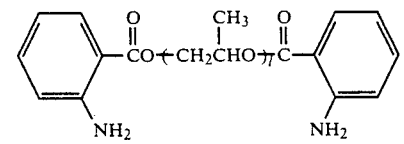

Poly(oxyethylene-oxypropylene) glycol bis(4-aminobenzoate)

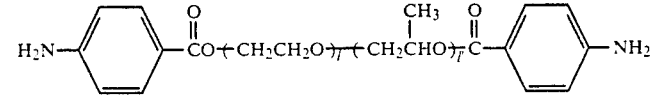

Polyoxybutylene glycol bis(4-aminobenzoate)

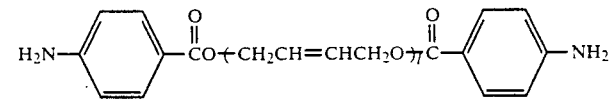

-continued
Polytetramethylene glycol bis(3,5-diaminobenzoate)
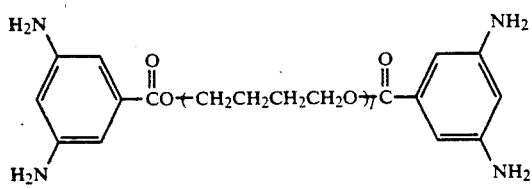
Polypropyleneether grycerol tris(4-aminobenzoate)
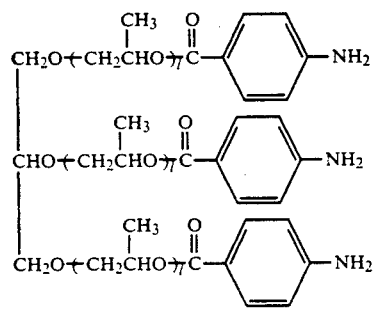
Polypropyleneether pentaerythritol tetrakis(4-aminobenzoate)
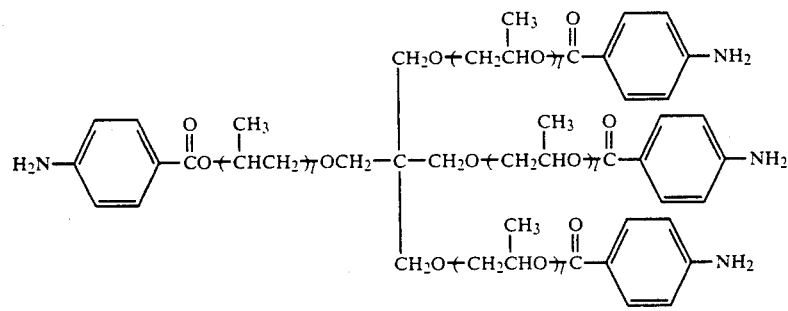
Polyoxyethylene bis(4-aminobenzamide)
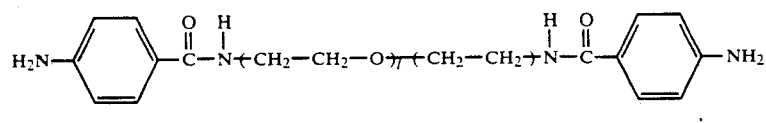
Polyoxypropylene bis(4-aminobenzamide)
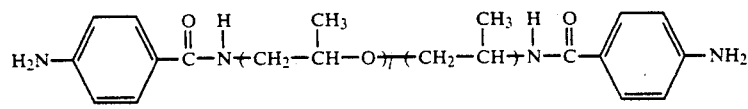
Polyoxypropylene bis(3,5-diaminobenzamide)
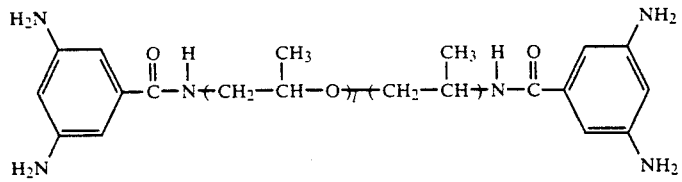

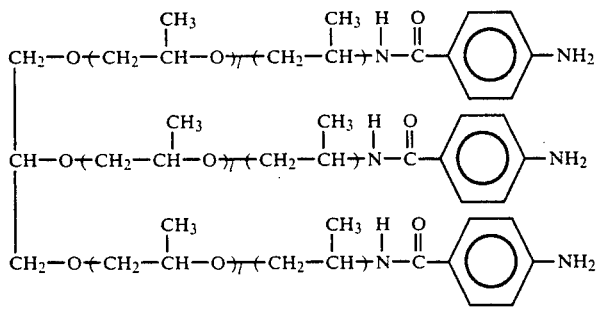

In these formulas, l and l' each are an integer which makes the average molecular weight of the alkyl group positioned at the center of the compound to be 200 or higher.

Aromatic polyamines used in the present invention may have any substituent, such as a halogen atom, an alkyl group, a trifluoromethyl group, or an alkoxycarbonyl group or the like incorporated therein.

Aromatic polyamines suitable for use in the present invention include aromatic diamines of a diaminodiphenyl methane system such as 4,4'-methylene bis(aniline), 4,4'-methylene bis(2-chloroaniline), 4,4'-methylene-bis(2,3-dichloroaniline)(TCDAM), 4,4'-methylene bis(2,5-dichloroaniline), 4,4'-methylene bis(2-methylaniline), 4,4'-methylene bis(2-ethylaniline), 4,4'methylene bis(2-isopropylaniline), 4'4'-methylene bis(2,6-dimethylaniline), 4,4'-methylene bis 2,6-diethylaniline)4,4'-methylene bis(2-ethyl-6-methylaniline), 4,4'-methylene bis)2-chloro-6- methylaniline), 4,4'-methylene bis(2-chloro-6-ethylaniline), 4,4-methylene bis(3-chloro-2 6-diethylaniline) 4 4'-methylene bis(2-trifluoromethyl aniline), and 4,4'-methylene-bis(2-methoxycarbonyl aniline) and the like; aromatic containing an oxygen or sulfur atom such as 4,4'-diaminodiphenyl ether, 4,4'-diamino-3,3'-dichlorodiphenyl ether, 4,4'-diaminodiphenyl sulfone, 4,4'-diamino-3,3'- dichlorodiphenyl sulfone, bis(4-aminophenoxyphenyl) sulfone, 1,2-bis(2-aminophenylthio) ethane, bis-[2-(2-aminophenylthio) ethyl] terephthalate and the like; aromatic diamines of an aminobenzoate system such as 1,3-propanediol bis(4-aminobenzoate), 1,4-butandiol bis(4-aminobenzoate), diethylene glycol bis(4-aminobenzoate), triethylene glycol bis(4-aminobenzoate), 4-chloro-3,5-diamino isopropylbenzoate, 4-chloro-3,5-diamino isobutylbenzoate and the like; aromatic diamines of a toluene diamine system such as 2,4-toluene diamine, 2,6-toluene diamine, 3,5-diethyl-2,4-toluene diamine, 3,5-diethyl-2,6-toluene diamine, 3,5-dimethylthio2,4-toluene diamine, and 3,5-dimethylthio-2,6-toluene diamine and the like; aromatic diamines of a diamino diphenylpropane system such as 2,2-bis(4-aminophenyl) propane, 2,2-bis(4-amino-3-methylphenyl) propane, 2,2-bis(4-amino-3-ethylphenyl) propane, 2,2-bis(4-amino-3-isopropylphenyl) propane, 2,2-bis(4-amino-3,5-dimethylphenyl) propane, 2,2-bis(4-amino-3,5-diethylphenyl) propane, 2,2bis(4-amino-3,5-diisopropylphenyl) propane, and 2,2-bis(4-amino-3-ethyl-5-diethylphenyl) propane and the like; aromatic diamines such as 3,3'-diamino benzophenone m- or p-phenylene diamine and m- or p-xylylene diamine and the like; and aromatic tetramines such as 3,3',4,4'-tetra-amino phenylether and 3,3',4,4'-tetra-amino biphenyl and the like. The above-described aromatic polyamines may be used alone or in combination.

Polyisocyanate compounds which may be used in the present invention include any polyisocyanates conventionally used to prepare a polyurethane elastomer, such as hexamethylene diisocyanate (HMDI), 2,2,4-trimethylhexamethylene diisocyanate, 1,3,6-hexamethylene triisocyanate, cyclohexane diisocyanate, dicyclohexylmethane diisocyanate, 2-isocyanate ethyl-2,6-diisocyahate hexanoate, an adduct of trimethylol propane with hexamethylene diisocyanate, 2,4-tolylene diisocyanate (2,4-TDI), 2,6-tolylene diisocyanate (2,6-TDI), a mixture of 2,4-TDI and 2,6-TDI, a dimer of 2,4-tolylene diisocyanate, xylylene diisocyanate (XDI), metaxylylene diisocyanate (MXDI), tetramethylxylylene diisocyanate m-phenylene diisocyanate, 4,4'-biphenyl diisocyanate, diphenylether-4,4'-diisocyanate, 3,3'-ditoluene-4,4'-diisocyanate (TODI), dianisidine diisocyanate (DADI), 4,4'-diphenylmethane diisocyanate (MDI), 3,3'-dimethyl-4,4'-diphenylmethane diisocyanate, 1,5-naphthalene diisocyanate (NDI), and triphenylmethane triisocyanate (TTI) and the like. The above-described polyisocyanates may be used alone or in combination.

Also, a so-called prepolymer, which is produced by a reaction between each of the above-described polyisocyanates and usual polyol, may be used in the present invention.

Although the amount of aromatic polyamine used in the present invention is determined by the desired physical properties of the polyurea resin and workability, it is generally 3% to 50%, preferably 5% to 50%, preferably 20% to 40%, by weight based on the amine component. (total of aromatic polyamines and the amine compound represented by formula (I)). If the amount of aromatic polyamine is too small the polyurea resin obtained exhibits insufficient hardness. If the amount of aromatic polyamine is too large, it is difficult to keep a mixed solution of the amine compound of formula (I) and the aromatic polyamine in a liquid state. Even when kept at a liquid state, its viscosity is highly increased to such a degree that it is difficult to handle the mixture and molding operation. This also causes crystals of polyurea to precipitate during molding, leading to an inability to prepare a uniform polyurea resin.

Also, in the present invention the ratio of the amine component including the amine compound represented by formula (I) and the aromatic polyamine to the polyisocyanate is generally 0.9–2.0, preferably 0.9 to 1.5, more preferably 1.0 to 1.3, in terms of the molar ratio of the amino group ($NH_2$) to the isocyanate group (—NCO) (—$NH_2$/—NCO).

Hereafter will be described an example of the manner of operation of the present invention.

A predetermined amount of the aromatic polyamine is added to the amine compound represented by formula (I) and then dissolved by heating, thereby preparing a mixed solution. The solution is then subjected to sufficient deareation under a reduced pressure of 10 to 20 mmHg, after which it is cooled to room temperature.

Subsequently a predetermined amount of polyisocyanate is added to and fully mixed with the solution, which is then subjected to deareation and poured into a mold preheated to 100° C.–120° C. for curing for a time not to exceed one hour, resulting in the preparation of a molded material. Next the molded material is removed from the mold and subjected to postcuring in an oven at 100° C. to 180° C., after which it is aged at room temperature for one week, finally resulting in a polyurea resin of the present invention.

In the present invention a catalyst may be used as required. The catalyst is preferably a material which can be dissolved in a mixed solution of the amine compound of formula (I) and the aromatic polyamine.

The catalysts include, tertiary amines such as triethylenediamine, triethylamine, tripropylamine, tributylamine, hexamethylenetetramine, N-alkylmorpholine, N-pentamethyldiethylene triamine, N-hexamethyltriethylene tetramine, N,N-diethylaniline, N,N-dimethylbenzylamine, N,N-dimethyllaurylamine, N,N-dimethylpiperadine, N,N'-dimethylpiperadine, N,N,N',N'-tetramethylene ethyldiamine, N,N,N',N'-tetramethyl propyldiamine, N,N,N',N'-tetramethyl-1,3-butanediamine, N,N,N',N'-tetramethyl hexamethylenediamine, N,N,N,'N'',N'-pentamethyl diethylenetriamine, tris(-dimethyl aminomethyl) phenol, N,N',N''-tris(dialkyl aminoalkyl) hexahydro-s-triazine, 1,8-diaza-bicyclo-5,4,0-undecene, 1,8-diaza-bicyclo-5,4,0-undecene-methylammonium methosulfate; and aziridinyl compounds and the like. Catalysts may also include organometallic catalysts, such as lewis acid catalysts, which include organotin compounds such as tetra-n-butyl tin, tri-n-butyl tin acetate, n-butyl tin trichloride, trimethyl tin hydroxide, dimethyl tin dichloride, dibutyl tin dilaurate, dibutyl tin di-2-ethyl hexoate, and stannous octoate and the like; metal acetylacetonates, such as zinc acetylacetonate, aluminum acetylacetonate, and cobalt acetylacetonate and the like; metal naphthenates, such as zinc naphthenate, lead naphthenate, lead caprylate, and cobalt naphthenate and the like; organomercuric compounds, such as phenyl mercury acetate, phenyl mercury oleate, and mercury naphthenate and the like; organolead compounds, such as lead octoate and lead naphthenate and the like; basic metal salts of organoborate ester; organic boron compound basic materials such as alkaline metal salts of carboxylic acid that have 2 to 12 carbon atoms, including potassium acetate, potassium propionate, potassium 2-ethylhexoate, sodium benzoate and the like, and alkaline metal salts of carboxylic acid that have 13 or more carbon atoms, including sodium oleate, potassium linoleate and the like, as well as alkaline metal salts of a weak acid other than carboxylic acid, including sodium phenolate and the like; strong basic materials such as sodium methoxide, benzyl trimethylammonium hydroxide, and hydroxide of alkaline metal and the like; chelate compounds represented by a chelate compound of salicylaldehyde with potassium; and co-catalysts such as phenols, epoxy compounds, and alkyl carbonates and the like.

The above-described catalysts may be used alone or in combination.

The amount of catalyst used is generally 0.01 to 5, preferably 0.05 to 3, parts by weight based on 100 parts by weight of the mixed solution of the amine compound of formula (I) with the aromatic polyamine.

In the process of the present invention, materials such as an oxidation inhibitor, an ultraviolet light absorber, a coloring-preventing agent, a hydrolysis preventive agent, an antifungal agent, a fire retardant agent, a coloring agent, a filler, a loading material, and the like, which have been used for a conventional polyurethane elastomer may also be suitably used, depending on the applications of the polyurea resin.

According to the present invention polyurea resin or a polyurea elastomer with increased hardness, strength, and toughness can be produced.

Also, a polyurea resin produced through the present invention has remarkably decreased temperature dependence and exhibits excellent heat resistance.

Further, the present invention uses aromatic polyamine, so that a polyurea elastomer containing a large proportion of phenyl groups, which the prior art could not produce, may be readily prepared without the use of solvent. The thus-obtained elastomer exhibits very high hardness and excellent toughness due to elongation above 50%. The elastomer also exhibits high heat resistance compared to a conventional polyurethane urea elastomer.

It will thus be noted that the present invention can provide a new material increased in heat resistance, hardness, and toughness which fills a gap between a thermosetting resin, such as epoxy resin, melamine resin, and polyamide resin or the like, which is hard but fragile, and urethane resin, which is increased in strength but inferior in heat resistance.

The physical properties of the polyurea resin or elastomer produced by the process of this invention can be arbitrarily selected within the following ranges: Hardness in Hs(D) is preferably 40–90, more preferably being 50–90, tensile strength is preferably 400–800 kg/cm$^2$, more preferably being 500–800 kg/cm$^2$, and TG index is preferably 300–400, more preferably being 330–400.

As can be indicated from the foregoing, polyurea resin prepared by the present invention can be used for many applications, such as for machine parts, mining materials, shoe sole materials, potting materials, rigid laminated boards, packing agents, binders, and the like. Especially, it is suitable for use for a roll for making paper and steel, plastic products, veneers, a roller for business machines, and the like.

The present invention will be understood more readily with reference to the following examples, however, which are not to be construed to limit the scope of the present invention.

EXAMPLE 1

100 parts by weight of polytetramethylene-glycol bis(p-aminobenzoate)(an amine compound of formula (I) wherein R has a molecular weight of 970) and 43 parts by weight of 4,4'-methylene bis(2-chloroaniline) were mixed together to prepare a mixture, which was then dissolved by heating, subjected to deareation, and then cooled to room temperature. The solution obtained was mixed with 73.4 parts by weight of liquid MDI, subjected to deareation, poured into a mold preheated to 100° C., and therein cured for 20 minutes before removal. It was thereafter subjected to postcure in a forced-draft oven and then aged at room temperature for one week, finally resulting in a polyurea resin.

The physical properties, polyamine conditions (composition and viscosity), composition and cure conditions, and workability of the procedure were as shown in Table 1. The physical properties were measured according to JIS K 6301.

The measurement of thermal characteristics of the polyurea resin yielded the results shown in Table 1. The testing methods of the thermal characteristics were as follows:

(a) TG Index (The method described in Polymer Digest, 1984, January, PP 26–34):

The TG index is usually used as an indication of the heat life of electrical insulating material and the like.

It was calculated by graph analysis of a thermogravimetric curve (TGA curve) obtained by measurements taken at a heating rate of 5° C./min. More particularly, the TG Index was calculated according to an equation, $$\frac{A + B}{2}$$

wherein A represents the temperature at which an extension of a line connecting the point of a loss in weight of 20% and the point of a loss in weight of 50% on TGA curve intersects a bassline on which the loss in weight is zero and B represents the temperature at which the loss in weight is 50%.

(b) Tg : tanδmax (°C)

Tg is frequently used to indicate a temperature range (a temperature range below Tg) which causes a material to exhibit high hardness and toughness. It was indicated by the temperature of a peak value corresponding to a glass transition point of tanδ measured at a heating rate of 3° C./min and a frequency of 10 Hz using a viscoelastic spectrometer (VES-FIII, manufactured by Iwamoto Seisakusho).

EXAMPLES 2 to 11

Example 1 was substantially repeated while varying the amount or kind of each of the aromatic polyamine and aromatic polyisocyanate with respect to polytetramethylene glycol bis(p-aminebenzoate), resulting in the preparation of polyurea resin. The physical properties and thermal characteristics of the polyurea resin obtained were measured as in Example 1. The results of Examples 2 to 8 and 9 to 11 were as shown in Tables 1 and 3, respectively. The hardness of the polyurea resin obtained in each of Examples 1 to 8 was measured while increasing its temperature, the results of which were as shown in Table 2.

COMPARATIVE EXAMPLE 1

24.4 g of liquid MDI was mixed with 100 g of polytetramethylene glycol bis(4-aminobenzoate) without adding 4,4'-methylene bis(2-chloroaniline), which is the aromatic polyamine thereto. The mixture obtained was treated similarly as in Example 1 to prepare a polyurea resin. The physical properties and thermal characteristics of the thus-obtained resin were measured as in Example 1.

Tables 1 and 3 show the physical properties, polyamine conditions (composition and viscosity), formulation and cure conditions, and workability. The physical properties were measured according to JIS K 6301.

Tables 1 and 3 indicate that the polyurea obtained in Comparative Example 1 is inferior in hardness and 100% modulus.

To the contrary, the polyurea resins obtained in Examples 1 to 11 were generally excellent in physical properties such as hardness, 100% modulus, and the like, as well as having increased TG indexes and Tg values, thus being highly superior in heat resistance to the polyurea of Comparative Example 1.

Further, Table 2 indicates that the decrease in initial hardness (70 to 80) of each of the polyurea resins obtained in Examples 1 to 8 is limited to a low level, irrespective of a temperature increase from 25° C. to 180° C. As such, the resin of the present invention has a highly decreased temperature dependence.

| | |
|---|---|
| Amine Compound (I) | Polytetramethylene glycol bis(4-aminobenzoate) (g) |
| Aromatic Polyamine | 4,4'-methylene bis(2,chloroaniline) (g) 1,3-propanediol bis(4-aminobenzoate) (g) 4,4'-methylene bis(2,3-dichloroaniline) (g) |
| Polyisocyanate | Liquid MDI (g) |
| Catalyst | Tributylamine (g) |
| Amine Compound-Aromatic Polyamine Mixture | Aromatic Polyamine Conc. (wt %) Viscosity (cp) at 30° C. |
| Formulation and Curing Conditions | NH$_2$/NCO Molar Ratio (NCO Index) Curing Temp (°C.) × Time (min) Postcure Temp (°C.) × Time (hr) |
| Workability | Pot Life (min) Demolding Time (min) |
| Physical Properties | Hardness (Shore D) 100% Modulus (kg/cm$^2$) Tensile Strength (kg/cm$^2$) Elongation (%) Peel Strength (kg/cm$^2$) |
| Thermal Characteristics | TG Index Tg; tan δ max (°C.) |

TABLE 2

| Experiment No. | Polyurea Resin | Hardness at Each Temperature (Shore D) | | | | |
|---|---|---|---|---|---|---|
| | | 25° C. | 50° C. | 100° C. | 150° C. | 180° C. |
| 1 | Polyurea Resin Obtained in Example 1 | 78 | 78 | 77 | 75 | 73 |
| 2 | Polyurea Resin Obtained in Example 2 | 83 | 82 | 81 | 78 | 76 |
| 3 | Polyurea Resin Obtained in Example 3 | 68 | 66 | 65 | 63 | 62 |
| 4 | Polyurea Resin Obtained in Example 4 | 76 | 75 | 73 | 71 | 68 |
| 5 | Polyurea Resin Obtained in Example 5 | 73 | 72 | 70 | 68 | 65 |
| 6 | Polyurea Resin Obtained in Example 6 | 78 | 77 | 75 | 71 | 68 |
| 7 | Polyurea Resin Obtained in Example 7 | 81 | 80 | 78 | 77 | 74 |

TABLE 2-continued

| Experiment No. | Polyurea Resin | Hardness at Each Temperature (Shore D) | | | | |
|---|---|---|---|---|---|---|
| | | 25° C. | 50° C. | 100° C. | 150° C. | 180° C. |
| 8 | Polyurea Resin Obtained in Example 8 | 82 | 82 | 81 | 78 | 76 |

TABLE 3

| | | Examples | | |
|---|---|---|---|---|
| | | 9 | 10 | 11 |
| Amine Compound (I) | Polytetramethylene glycol bis(4-aminobenzoate) (g) | 100 | 100 | 100 |
| Aromatic Polyamine | 4,4'-methylene bis(2-chloroaniline) (g) | 43 | 43 | 43 |
| | 1,3-propanediol bis(4-aminobenzoate) (g) | | | |
| | 4,4'-methylene bis(2,3-dichloroaniline) (g) | | | |
| Polyisocyanate | Liqudi MDI (g) | 67 | 41.7 | 24.3 |
| | Dicyclohexylmethane diisocyanate (g) | | 27.8 | |
| | 2-isocyanateethyl-2,6-diisocyanate hexanoate (g) | | | 5.6 |
| | 3,3'-ditoluene-4,4'-diisocyanate (g) | | | 36.4 |
| | Adduct of trimethylol propane and hexamethylene diisocyanate (g) | 11.2 | | |
| Amine Compound-Aromatic Polyamine Mixture | Aromatic Polyamine Conc. (wt %) | 30 | 30 | 30 |
| | Viscosity (cp) at 30° C. | 2700 | 2700 | 2700 |
| Formulation and Curing Conditions | NH$_2$/NCO Molar Ratio (NCO Index) | 1.05 | 1.05 | 1.02 |
| | Curing Temp (°C.) × Time (min) | 100 × 20 | 120 × 40 | 100 × 20 |
| | Postcure Temp (°C.) × Time (hr) | 120 × 2 | 120 × 2 | 120 × 2 |
| | | 180 × 4 | 180 × 4 | 180 × 4 |
| Workability | Pot Life (min) | 3.0 | 7.0 | 5.5 |
| | Demolding Time (min) | 4.0 | 15.0 | 6.0 |
| Physical Properties | Hardness (Shore D) | 78 | 76 | 77 |
| | 100% Modulus (kg/cm$^2$) | 508 | 420 | 482 |
| | Tensile Strength (kg/cm$^2$) | 521 | 512 | 531 |
| | Elongation (%) | 111 | 162 | 125 |
| | Peel Strength (kg/cm$^2$) | 216 | 197 | 223 |
| Thermal Characteristics | TG Index | 342 | 330 | 346 |
| | Tg; tan δ max (°C.) | 268 | 250 | 281 |

Having described our invention as related to the embodiment, it is our intention that the invention be not limited by any of the details of the description, unless otherwise specified, but rather be construed broadly within its spirit and scope as set out in the accompanying claims.

What we claim is:

1. A process for producing polyurea resin, which comprises reacting a first aromatic amine compound having the formula:

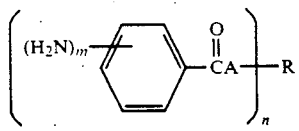

wherein R is an n-valent polyalkylene, polyalkylene ether or polyalkylene polyester group with an average molecular weight of at least 200, which group is saturated or contains an unsaturated bond; A is —O— or —NH—; m is an integer of 2 or 3; and n is an integer of 2 to 4; with a second aromatic amine and a polyisocyanate, wherein the amount of the second aromatic amine is 5%–50% by weight based on the total amount of amine component, and wherein the second aromatic amine is a diamino-diphenylmethane selected from the group consisting of 4,4'-methylene bis(aniline), 4,4'-methylene bis(2-chloroaniline), 4,4'-methylene-bis(2,3-dichloroaniline) (TCDAM), 4,4'-methylene bis(2,5-dichloroaniline), 4,4'-methylene bis(2-methylaniline), 4,4'-methylene bis(2-ethylaniline), 4,4'methylene bis(2-isopropylaniline), 4,'4'-methylene bis(2,6-dimethylaniline), 4,4'-methylene-bis(2,6-diethylaniline), 4,4'-methylene bis(2-6-methylaniline), 4,4-methylene bis(2-chloro-6-methylaniline), 4,4'-methylene bis(2-chloro-6-ethylaniline), 4,4'-methylene-bis(3-chloro-2,6-diethylaniline), 4,4'methylene bis(2-trifluoromethyylaniline), and 4,4'methylene bis(2-methoxycarbonylaniline).

2. The process as claimed in claim 1, wherein R in the amine compound of the formula has an average molecular weight of 200–5000.

3. The process as claimed in claim 1, wherein A in the amine compound of the formula is an oxygen atom.

4. The process as claimed in claim 1, wherein the first aromatic amine compound is polytetramethylene glycol bis(4-aminobenzoate).

5. The process as claimed in claim 1, wherein the polyisocyanate is selected from the group consisting of 4,4'-diphenylmethane diisocyanate, dicyclohexylmethane diisocyanate, 2-[isocyanateethyl] isocyanatoethyl-2,6-diisocyanate hexanoate, 3,3-ditoluene-4,4-diisocyanate and an adduct of trimethylolpropane and hexamethylene diisocyanate.

6. The process as claimed in claim 1, wherein the amount of the second aromatic polyamine is 20% to 40% by weight based on the total amount of amine component.

7. The process as claimed in claim 1, wherein the ratio of the first aromatic component to the polyisocyanate 0.9 to 1.5 in terms of molar ratio of the amino group to the isocyanate group.

8. The process as claimed in claim 1, wherein the reaction is conducted without using solvent.

9. A polyurea resin obtained by a process according to claim 1.

10. The polyurea resin as claim in claim 9, wherein the resin has hardness of 50–90 in Hs(D), tensile strength of 500–800 kg/cm$^2$ and heat resistance of 330–400 in TG index.

11. The process as claimed in claim 1, wherein the first aromatic amine compound is selected from the group consisting of polyethylene glycol bis (4-aminobenzoate), polyethylene glycol bis (2-aminobenzoate), polyethylene glycol bis (3-aminobenzoate), polytetramethylene glycol bis (4-aminobenzoate), polytetramethylene glycol bis (2-aminobenzoate), polypropylene glycol bis (4-aminobenzoate), polypropylene glycol bis (2-aminobenzoate), poly(oxyethylene-oxypropylene) glycol bis (4-aminobenzoate), polyoxybutylene glycol bis (3,5-diaminobenzoate), polypropylene ether glycerol tris (4-aminobenzoate), polypropylene ether pentaerythritol tetrakis (4-aminobenzoate), polyoxyethylene bis (4-aminobenzamide), polyoxypropylene bis (4-aminobenzamide) and polyoxypropylene bis (3,5-diaminobenzamide).

12. The process as claimed in claim 1, which further comprises reacting said first aromatic amine compound, said second aromatic amine and said polyisocyanate in the presence of a catalyst, said catalyst being used in an amount of about 0.01 to 5 parts by weight based on 100 parts by weight of a solution of the first aromatic amine compound and the second aromatic amine.

* * * * *

UNITED STATES PATENT AND TRADEMARK OFFICE
CERTIFICATE OF CORRECTION

PATENT NO. : 5,039,775

DATED : AUGUST 13, 1991

INVENTOR(S) : YOSHIJIRO OYAIZU

It is certified that error appears in the above-identified patent and that said Letters Patent is hereby corrected as shown below:

Column 7, line 61, change "(4-amino-3-ethyl-5-diethylphenyl)"
to --(4-amino-3-ethyl-5-methylphenyl)--;
line 64, change "diaminc" to --diamine--.

Column 8, line 24, change "diisocyahate" to --diisocyanate--;
line 30, after "diisocyanate" (first occurrance),
insert --,--;
Line 48, after "component" delete ".".

Column 9, lines 28-29, change "dimethylpiperadine" to
--dimethylpiperidine--;
line 33, change "N,N,N,'N"" to --N,N,N',N"--;
lines 33-34, change "tris(-dimethyl" to
--tris(dimethyl--

UNITED STATES PATENT AND TRADEMARK OFFICE
CERTIFICATE OF CORRECTION

PATENT NO. : 5,039,775

DATED : August 13, 1991

INVENTOR(S) : Yoshijiro Oyaizu

It is certified that error appears in the above-indentified patent and that said Letters Patent is hereby corrected as shown below:

Col. 12, line 32, delete "Table 1" in its entirety and replace with new --Table 1--

Table 1

| | | Examples | | | | | | | | Comparative Example |
|---|---|---|---|---|---|---|---|---|---|---|
| | | 1 | 2 | 3 | 4 | 5 | 6 | 7 | 8 | 1 |
| Amine Compound (I) | Polytetramethylene glycol bis(4-aminobenzoate)(g) | 100 | 100 | 100 | 100 | 100 | 100 | 100 | 100 | 100 |
| Aromatic Polyamine | 4,4'-methylene bis(2-chloroaniline)(g) 1,3-propanediol bis(4-aminobenzoate)(g) 4,4'-methylene bis(2,3-dichloroaniline)(g) | 43 | 66.7 | 25 | 42.9 | 25 | 43 | 66.7 | 66.7 | |
| Polyisocyanate Catalyst | Liquid MDI (g) Tributylamine (g) | 73.4 | 100 | 48.5 | 65.9 | 51.0 0.1 | 63.3 | 84.8 | 100 0.1 | 24.4 |
| Amine Compound-Aromatic Polyamine Mixture | Aromatic Polyamine Conc. (wt%) Viscosity(cp) at 30°C | 30 2700 | 40 3500 | 20 3000 | 30 3200 | 20 3000 | 30 3600 | 40 4100 | 40 4100 | 0 2500 |
| Formulation and Curing Conditions | NH₂/NCO Molar Ratio (NCO Index) Curing Temp (°C) x Time (min) Postcure Temp (°C) x Time (hr) | 1.05 100x20 120x2 180x4 | 1.05 100x20 120x2 180x4 | 1.05 100x20 120x2 160x4 | 1.05 100x20 120x2 160x4 | 1.25 100x20 120x2 160x4 | 1.05 100x20 120x2 160x4 | 1.05 100x20 120x2 160x4 | 1.25 100x20 120x2 160x4 | 1.05 100x20 100x15 — |
| Workability | Pot Life (min) Demolding Time (min) | 2.5 3.0 | 2.5 3.0 | 8 5 | 6 3 | 7.5 4 | 6.5 8 | 6 6 | 6 6 | 15 15 |
| Physical Properties | Hardness (Shore D) 100% Modulus (kg/cm²) Tensile Strength (kg/cm²) Elongation (%) Peel Strength (kg/cm²) | 78 507 586 165 165 | 82 — 717 65 219 | 70 262 451 267 163 | 76 420 483 175 198 | 73 489 502 150 178 | 78 379 610 206 135 | 80 — 669 86 208 | 81 488 598 55 151 | 45 70 409 110 -- |
| Thermal Characteristics | TG Index Tg; tanδ max (°C) | 348 275 | 356 285 | 373 210 | 378 250 | 382 244 | 333 245 | 344 256 | 353 263 | 370 |

Signed and Sealed this

Third Day of August, 1993

Attest:

MICHAEL K. KIRK

*Attesting Officer*      *Acting Commissioner of Patents and Trademarks*

UNITED STATES PATENT AND TRADEMARK OFFICE
CERTIFICATE OF CORRECTION

PATENT NO. : 5,039,775

DATED : AUGUST 13, 1991

INVENTOR(S) : YOSHIJIRO OYAIZU

It is certified that error appears in the above-identified patent and that said Letters Patent is hereby corrected as shown below:

Column 13, lines 66-67, change "4,4'-methylene bis(2-6-methylaniline)" to --4,4'-methylene bis(2-ethyl-6-methylaniline)--;

Column 14, lines 50-51, change "3,3-ditoluene-4,4-diisocyanate" to --3,3'-ditoluene-4,4'-diisocyanate--; and Column 14, line 58, after "aromatic" insert --amine--.

Signed and Sealed this

Twelfth Day of October, 1993

Attest:

BRUCE LEHMAN

Attesting Officer    Commissioner of Patents and Trademarks